June 8, 1943.  L. S. WILLIAMS  2,321,346
WEIGHING SCALE
Filed Dec. 9, 1941  5 Sheets-Sheet 5
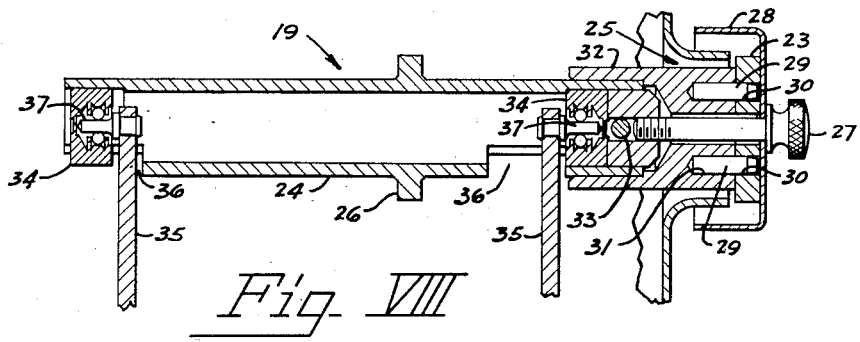
Fig. VIII
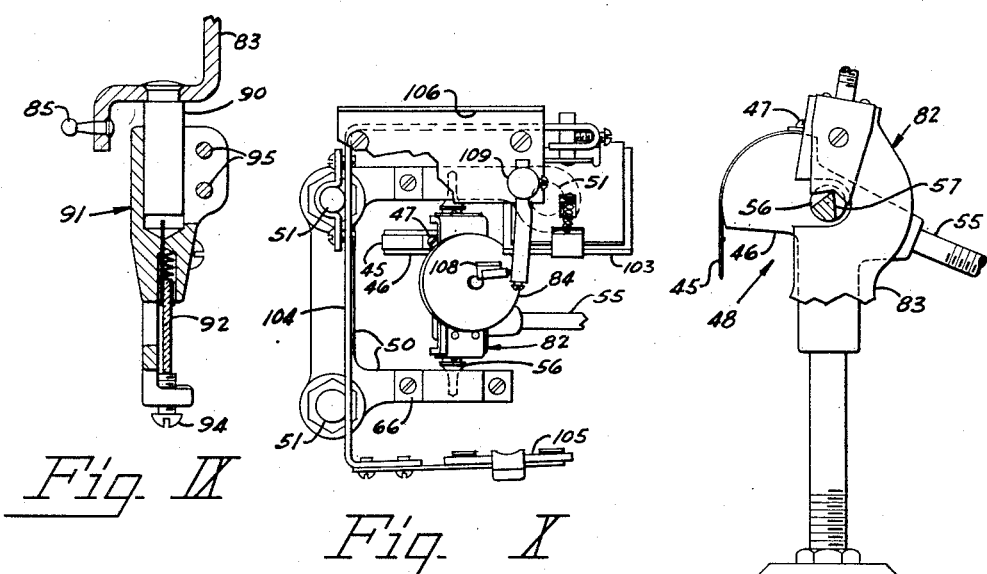
Fig. IX  Fig. X
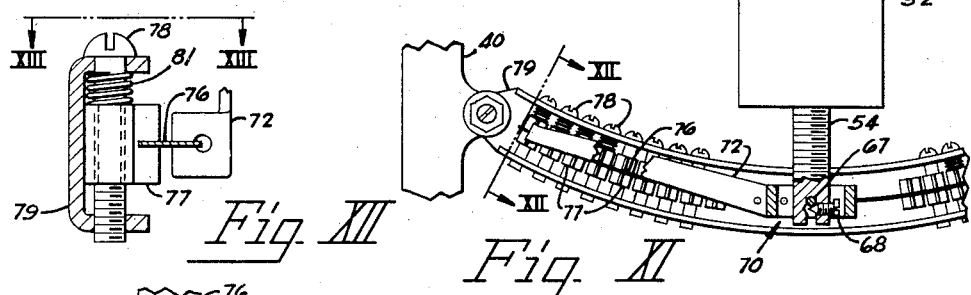
Fig. XI
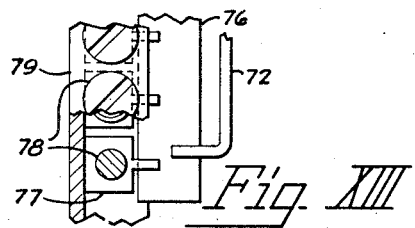
Fig. XII
Fig. XIII
Lawrence S. Williams
INVENTOR
BY Marshall & Marshall
ATTORNEYS Patented June 8, 1943

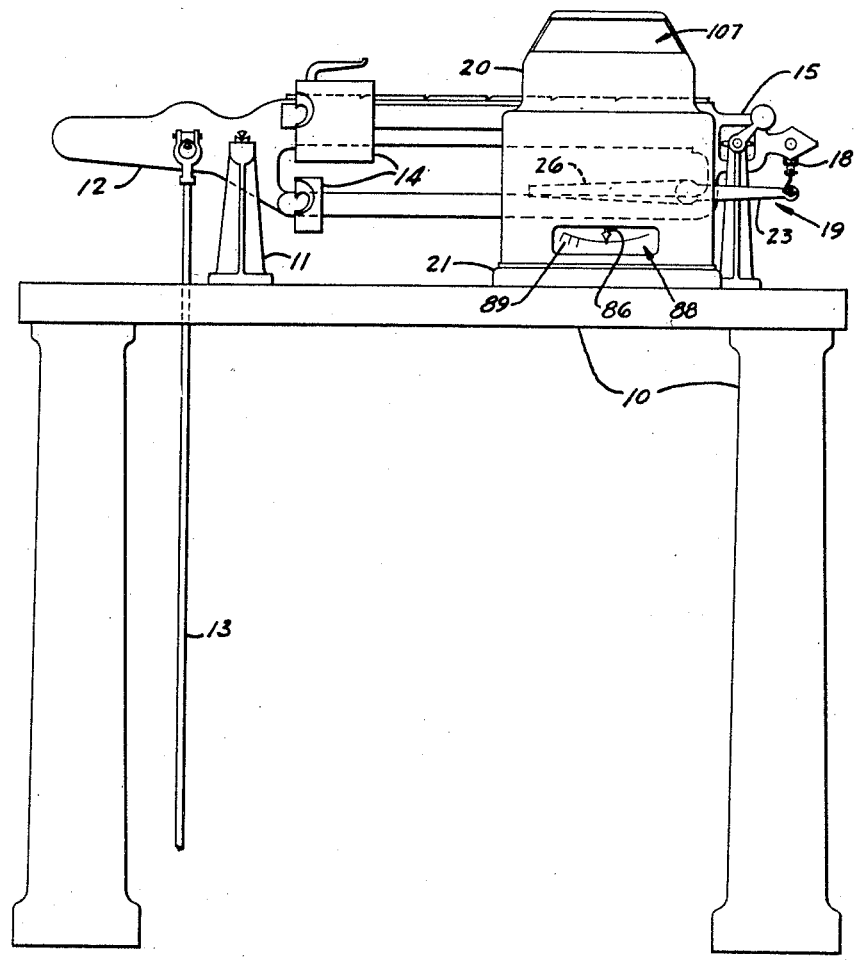
Fig. I
Lawrence S. Williams
INVENTOR
BY Marshall & Marshall
ATTORNEYS

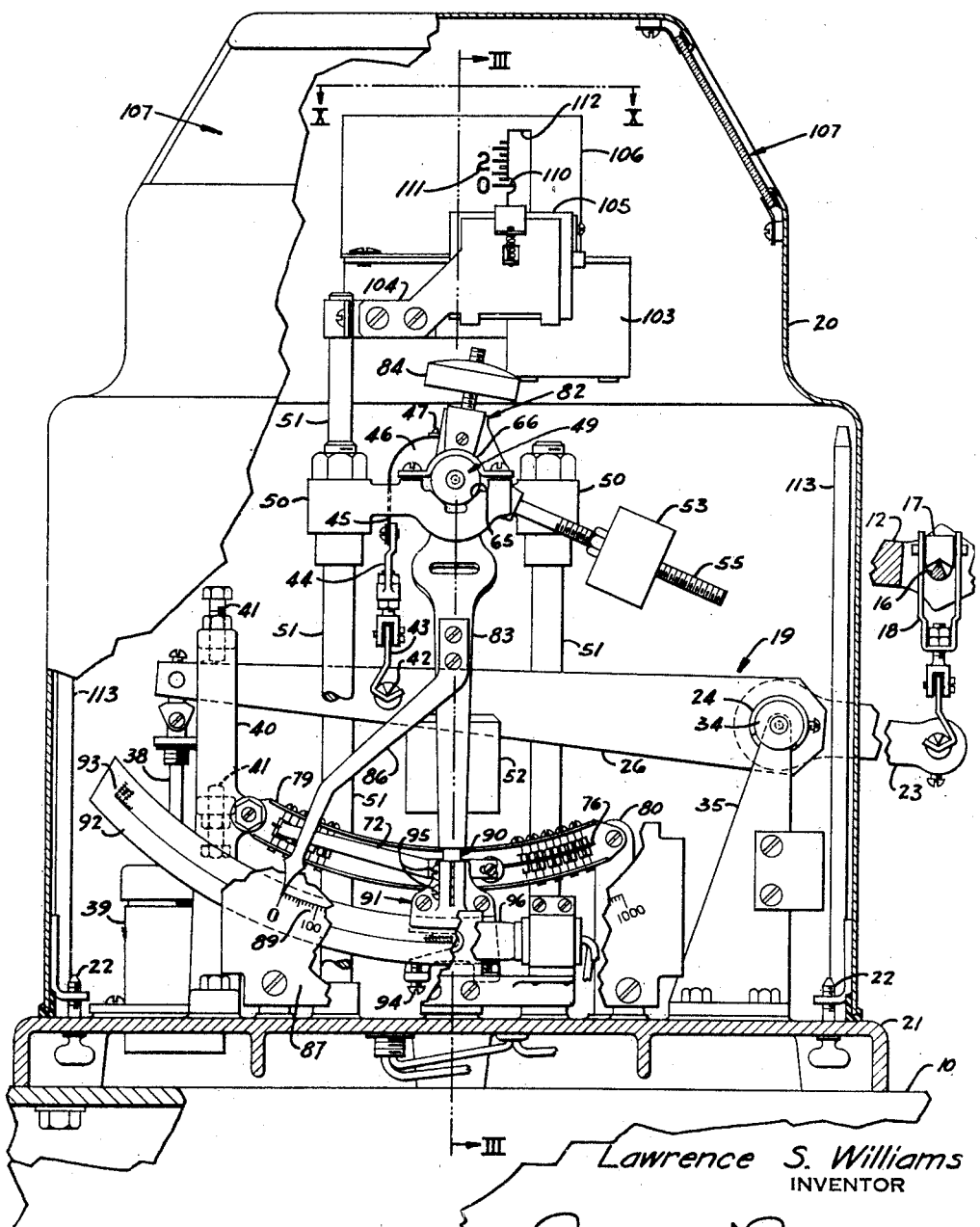

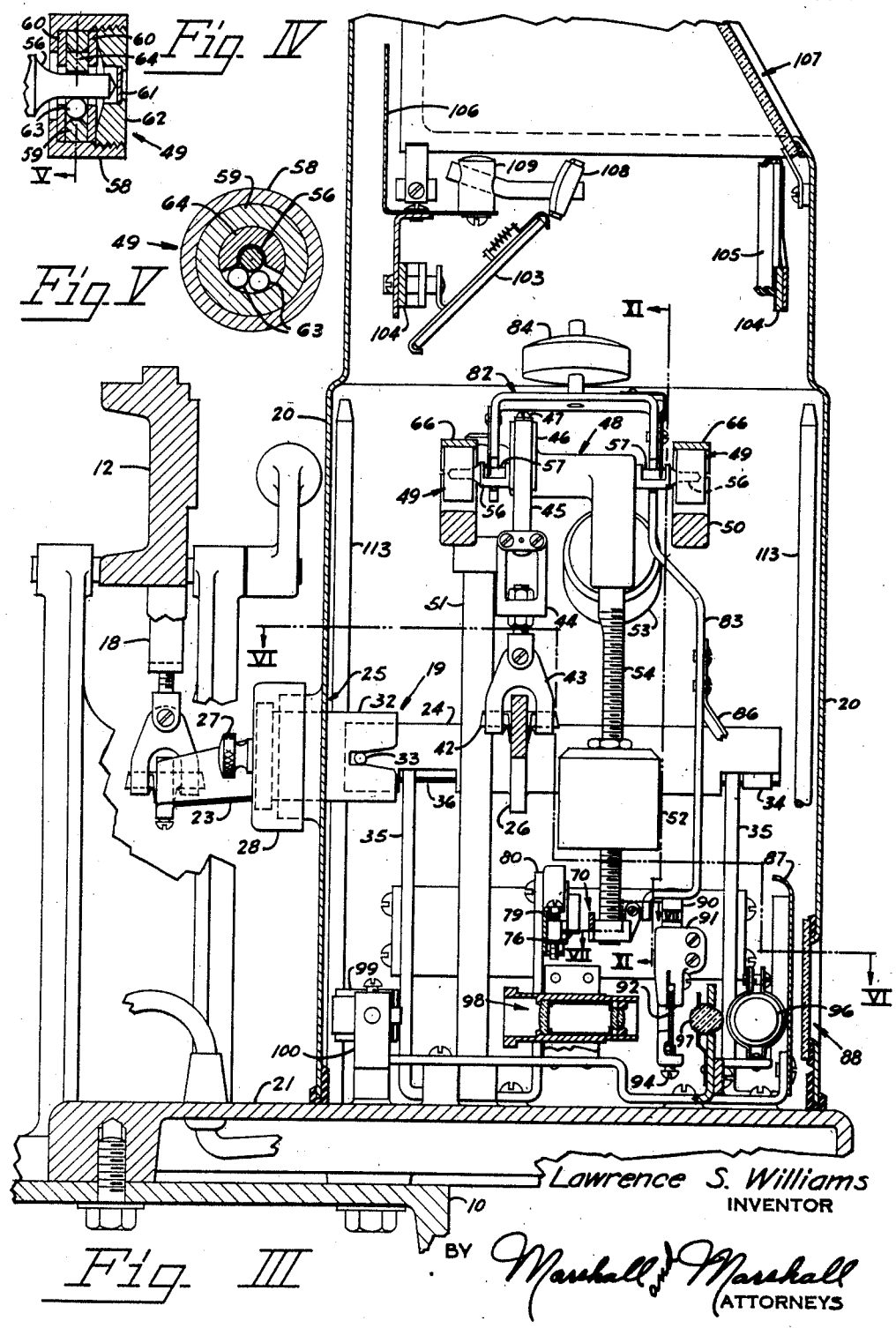

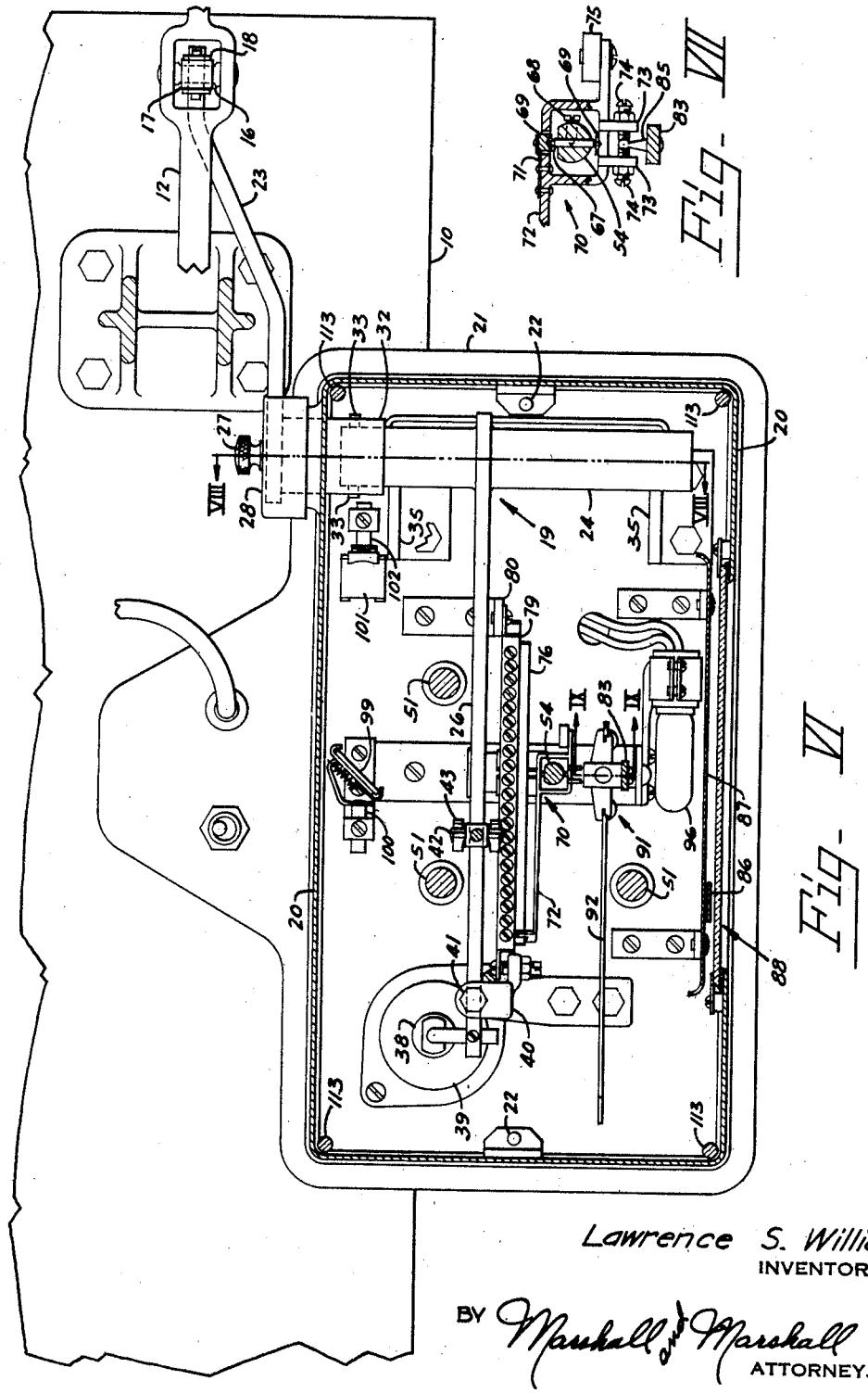

2,321,346

UNITED STATES PATENT OFFICE 2,321,346

WEIGHING SCALE

Lawrence S. Williams, Toledo, Ohio, assignor to Toledo Scale Company, Toledo, Ohio, a corporation of New Jersey Application December 9, 1941, Serial No. 422,293

7 Claims. (Cl. 265—27)

This invention relates to weighing scales, and more particularly to weighing scales in which an image of a transparent movable indicia-bearing element is projected on a screen to indicate the weight of loads on the scale.

Of the many problems encountered in the construction of weighing scales, one of the most difficult to overcome is the provision of a sufficiently large number of indicia of great enough size and clarity adequately to cover the range of weight of loads on the scale and to indicate small enough changes in such weight and yet to keep the mass and span of the movable portion of the indicating means light enough and small enough so as not to incorrectly influence the operation of the scale and cause errors.

In general the indication of most automatic weighing scales is given by the combination of a stationary chart and movable indicator, or a movable indicator and stationary chart. In either system, since the size of the movable part is limited by its weight, and the total relative movement of the chart and indicator is limited by the maximum distance of movement through which the movable part can be driven by the weighing mechanism, the maximum number of indicia of sufficient size to be legible which can be displayed is relatively low. Even this number is not used because of weights and measures regulations concerning the minimum size of indicia and the spaces between them. The net result of all these restrictions is that the practical maximum number of indicia which can be displayed by an automatic commercial weighing scale is about 1000 or 1200.

Additional capacity is provided in two ways. Each indicia may be used to represent a greater variation in weight and/or weights may be provided to counterbalance fixed even amounts of loads and their capacity added, in any of several ways, to the weight shown by the indicator. This is not entirely satisfactory because the indicia must be added and errors often result and because of the additional operations necessary to add the increased capacity weights. These difficulties have been partially overcome by the construction of projecting scales which have small light transparent charts and every small indicia but which, by projection, greatly magnify such indicia and provide large and legible virtual indicia on a screen.

The very nature of a projecting scale, however, has introduced many other difficulties. Since the projecting mechanism is far too heavy to be moved by the scale, the transparent chart has been so moved, but because of the weight of a transparency which is strong enough to resist warping and flexing, the charts must be kept relatively small. This requires that the indicia borne thereby must be most minute and that the projection system must produce relatively high magnification.

Therefore with such tiny indicia and such a greatly enlarged image serving as an indicator, it can be seen that almost any error in the formation or location of such indicia may result in a serious error in indication.

In addition, of course, there are the errors common to all weighing mechanisms, which are corrected by balancing the movable part of the indicating means. Almost all conventional scale indicators for large capacity scales rotate through approximately 360°. They are usually provided with adjustable weights which can be moved to vary their balance at points such as ¼, and ¾ capacity (because no other portion of the scale mechanism can be adjusted to correct errors at these points). Since 360° rotation of a transparent chart is not desirable because of weight, mass, strength, etc., most projecting scales have no provision for such "quarter" sealing and must rely on the corrections at 0, ½ and full capacity made on other parts of the mechanism.

It is an object of this invention to provide a projection weighing scale for indicating a range of weight several times greater than that displayed by conventional weighing scales in large legible indicia.

It is another object of this invention to provide a projection weighing scale for indicating much smaller variations of weight over a large range of weight than that indicated by conventional weighing scales.

Another object of this invention is to provide a projection weighing scale in which errors in indication resulting from minute errors in the construction of certain small parts can be easily, accurately and permanently compensated for.

A further object of this invention is to provide a weighing scale in which the moving part of the indicating mechanism may move substantially less than 360° and yet which can be "sealed out" at the "quarter points."

It is a still further object of this invention to provide means for correctively influencing the movement of a movable transparent scale attached to the condition responsive element of a measuring instrument to compensate for errors in indication caused by errors in construction or operation of such instrument.

More specific objects and advantages are apparent from the description, in which reference is had to the accompanying drawings illustrating a preferred form of scale embodying the invention.

In the drawings:

Fig. I is a view in elevation of a conventional weighing scale associated with a device embodying the invention.

Fig. II is a view in elevation on a greatly enlarged scale of a projecting scale embodying the invention, certain parts being broken away and certain parts being shown in section.

Fig. III is a vertical sectional view, taken from the line III—III of Fig. II.

Fig. IV is a greatly enlarged fragmentary sectional view of a pivotal mounting for an oscillating portion of the device shown in Fig. II.

Fig. V is a vertical sectional view, taken on the line V—V of Fig. IV.

Fig. VI is a horizontal sectional view, taken on the line VI—VI of Fig. III.

Fig. VII is a fragmentary horizontal sectional view on an enlarged scale, taken on the line VII—VII of Fig. III.

Fig. VIII is a fragmentary vertical sectional view on an enlarged scale, taken on the line VIII—VIII of Fig. VI.

Fig. IX is a fragmentary detailed sectional view on an enlarged scale, taken substantially on the line IX—IX of Fig. VI.

Fig. X is a fragmentary plan view, taken substantially from the position indicated by the line X—X of Fig. II.

Fig. XI is a fragmentary detailed view, taken from the position shown by the line XI—XI of Fig. III.

Fig. XII is a greatly enlarged detailed view, taken on the line XII—XII of Fig. XI.

Fig. XIII is a view, taken from the position shown by the line XIII—XIII of Fig. XII.

These specific drawings and the specific description that follows merely disclose and illustrate the invention and are not intended to impose limitations upon the claims.

Mounted on a main stand 10, in a fulcrum bracket 11, is a weighing scale beam 12 which is connected to the load receiving portion of the scale (not shown) by means of a steelyard rod 13 having a bearing in its upper end which rides on the load pivot of the beam 12. The beam 12 has poises 14 and a trig and locking loop 15 for counterbalancing tare weight and indicating balance. A pivot 16, mounted in the nose end of the beam 12, supports a bearing 17 (Fig. II) which is mounted in the upper end of a link 18, the lower end of which is pivotally connected to one end of a main lever 19 extending from a housing 20 of the projecting scale. The housing 20 is attached to a base 21, mounted on the stand 10, by means of thumb screws 22.

The lever 19 consists of an outwardly extending arm 23 (Figs. II and III) which is removably attached to the end of a pipe body 24 projecting through an opening 25 in the rear of the housing 20, the pipe body 24, and a second arm 26 which is integrally constructed with the body 24 and extends horizontally therefrom in the opposite direction from the arm 23. The arm 23 of the lever 19 may be detached therefrom by unscrewing a thumb screw 27 (Figs. III and VIII), removing a cap 28 and taking the arm 23 off pins 29. The pins 29 snugly fit into holes 30 bored through the end of the arm 23 in radially spaced parallel relationship and are driven into similarly bored holes 31 in a sleeve 32 which slides over and around the pipe body 24 engaging studs 33 which project from the pipe body 24 in a slot in the wall of the sleeve 32. By means of the pins 29, the arm 23 may be mounted on the body 24 in the position shown in Figs. II and III, or may be rotated with respect to the body 24 to vary the angular relationship between the arms 23 and 26 so that the arm 26 can remain horizontal and the arm 23 be connected to various types of weighing scales to permit the housing 20 to be located above, below or to either side of the connection point with the weighing scale. The pipe body 24 is rigidly connected to the arm 23 when they are assembled, by means of the pins 29 and the studs 33 engaged in the sleeve 32. The pipe body 24 is mounted for rockable movement on its axis on ball bearings 34 (Fig. VIII) which are fitted into the interior of the pipe body 24. Brackets 35 extend upwardly from the base 21 of the projecting scale through slots 36 in the wall of the pipe body 24 and have at their upper ends horizontal axles 37 on which the bearings 34 rotate.

The arm 26 extends horizontally within the housing 20, and has attached to its furthermost end a plunger rod 38 (Fig. II) which extends downwardly into a motion damping dashpot 39. A bracket 40 (Figs. II and VI) is located just to one side of the end of the arm 26 and has adjustable stops 41 to limit the angular movement of the arm 26. A pivot 42, mounted in the arm 26, is engaged by a bearing yoke 43 which is connected, by means of a link 44, to the lower end of a metallic ribbon 45 which overlies the curved surface of a sector-like cam 46 to which the ribbon is fixedly attached by means of a screw clamp 47. The sector-like cam 46 is an integral part of a pendulum body 48 which is pivotally mounted in bearings 49 located in a cross bracket 50 (see also Fig. III) supported by frame members 51. The pendulum body 48 also includes two pendulum weights 52 and 53 which are adjustably mounted on stems 54 and 55 extending radially from the pendulum body 48 and can be moved radially with respect to the axis of the pendulum body 48 to vary their load counterbalancing ability. The pendulum body 48 is mounted in the bearings 49 by means of axles 56 which extend horizontally from the pendulum body 48 and have sharp knife edges 57 cut in their upper surfaces. The outermost ends of the axles 56, which extend into the bearings 49, are turned to a smaller diameter and have points at their very ends (Fig. IV).

Each of the bearings 49 (Figs. IV and V) consists of a housing 58 in which an outer race 59, side wall members 60 and a thrust receiving disk 61 are clamped by a retaining nut 62 threaded into the housing 58. Two balls 63 are located within the race and between the two opposing faces of a C shaped member 64. The two opposing faces of the member 64 embrace an angle of only a sufficient number of degrees to leave open a space within the race wide enough to permit the balls to travel back and forth on the inner surface of the race 59 under the rocking motion of the axle 56. The bearings 49 are clamped into substantially V shaped seats 65 in the cross bracket 50 by clamps 66 (Fig. II).

The lower end of the pendulum stem 54 is bifurcated (Figs. VII and XI) and has a double pointed pin 67 held between the bifurcations by a pointed set screw 68 which is screwed into the stem 54 passing transversely across the slot therein. The pin 67 is mounted in conical bearings 69 in the body of a bell crank 70 for which the pin 67 serves as an axle. One of the bearings 69 is resiliently mounted in the bell crank 70 by means of a spring-like member 71 riveted to the bell crank 70 (Fig. VII). The bell crank 70 has one long substantially horizontally extending arm 72 which extends along the vertical plane of movement of the pendulum stem 54. The other arm of the bell crank 70 consists of two ears 73 through which are threaded horizontal screws 74 having concave depressions in their innermost ends. The screws 74 may be adjustably positioned in the ears 73 with relation to each other. A counterweight 75 is mounted on the bell crank 70 to counterbalance the weight of the arm 72.

The end of the arm 72 (Figs. XI, XII, XIII) is turned at right angles to the body and split, the bifurcations straddlingly engaging an arcuate ribbon 76 which is fastened in blocks 77 through each of which there extends a screw 78 which is also threaded through the two arms of a substantially U shaped arcuate channel member 79, one end of which is supported in the bracket 40 and the other end of which is attached to a bracket 80 fastened to the base 21. Around each of the screws 78, between the upper arm of the U shaped channel member 79 and the block 77, is a spring 81 which works against the screw 78 to hold the block 77 in its adjusted position. As the pendulum body 48 pivots in the bearings 49 and oscillates the pendulum stem 54, the arm 72 of the bell crank 70 slides along the ribbon 76.

An inverted L shaped member 82 (Fig. III) is mounted on the knife edges 57 of the axles 56 and its long arm 83 extends downwardly substantially parallel to the pendulum stem 54. A weight 84 is attached to the upper end of the member 82 to balance the weight of the arm 83. A ball-ended pin 85 (Figs. VII and IX) extends horizontally through the lower end of the arm 83, its ball-like portion being embraced by the concave ends of the screws 74 and forming a connection between the arm 83 and the short arm of the bell crank 70.

An indicator arm 86 is attached to the arm 83 and sweeps over a vertically disposed chart 87 (Figs. I, II and III) which is located just within the front wall of the housing 20 and visible through an opening 88 therein. The chart 87 has an arcuately arranged series of indicia 89 thereon which cooperates with the indicator arm 86 to indicate approach to the weight of the load on the scale. The arm 83 has a horizontal portion immediately above the location of the pin 85 (Figs. III and IX) to which is attached a vertically extending stud 90. A clamping member 91 (see also Figs. II and III) is fastened around the stud 90 and adjustably holds an arcuate transparent chart 92. The chart 92 is movable in a vertical plane parallel to the plane of movement of the pendulum stem 54 and indicator arm 86. The chart 92 bears transparent indicia 93 radially arranged with respect to the chart arm 83.

The chart 92 is adjustable relative to the arm 83 in three ways; its concentricity with the pivotal point of the arm 83 may be adjusted by means of screws 94 (Figs. II and IX) which clamp the chart in the member 91, it may be radially adjusted with respect to the pivot point of the arm 83 by loosening screws 95 and sliding the member 91 along the stud 90 and it may be adjusted to fall in a vertical plane parallel to the plane of movement of the pendulum stem 54 by rotating the member 91 on the stud 90.

A lamp 96 (Figs. II, III, IV) is centered on a horizontal line passing through the indicia 93 on the chart 92 and a condensing lens 97 (Fig. III) is mounted between the lamp 96 and the chart 92. A projecting lens system 98 is located on the same horizontal line on the opposite side of the chart 92 from the lamp 96 and the condensing lens 97. Light emanating from the lamp 96 is condensed in the lens 97, passes through the chart 92 and then through the projecting lenses 98. A mirror 99 is located in the path of the light (Figs. III and VI) on an adjustable bracket 100. The mirror 99 reflects the light horizontally at an angle approximately 90° from the angle of incidence with the mirror 99. A second mirror 101 is adjustably mounted in a bracket 102 (Fig. VI) and reflects the light upwardly within the housing 20 where it strikes a third mirror 103 which is mounted in a bracket 104 supported by one of the frame members 51, (see also Fig. X). The light is then reflected to another mirror 105 mounted near the front of the housing 20 on an arm of the bracket 104. The light then reflects from the mirror 105 to a specular screen 106 which is mounted on the bracket 104 at the back of the housing 20 and is visible through a windowed opening 107 in the front and side walls of the upper part of the housing 20.

A combination prism and lens 108 (Fig. III) is mounted in a stud 109 attached to the bracket 104 and is located in the path of a part of the light, projected and reflected by the optical system just described, which passes through a transparent area in the chart 92 extending along and just removed from the peripheral edge of the indicia 93. Because of the characteristics of the projecting lenses 98 this ray is divergent with respect to the light rays carrying the projected image of the indicia 93 and therefore strikes the combination prism and lens 108 which bends it in one plane to swing it over adjacent to the image of the indicia 93 and focuses it in a plane at right angles thereto to form a thin indicating index 110 on the screen 106. The combination prism and lens 107 is preferably of colored glass and thus the index 110 (Fig. II) formed by the light passing through the combination prism and lens 107 is in sharp contrast to an image 111 of the indicia 93 which is formed on the screen 106. An opening 112 in the screen 106 is located immediately adjacent the place where the index 110 and image 111 are formed and serves to sharply delineate the edge of the image and index. To further sharpen the images on the screen 106, the opening 112 may be backed up with light absorbent, non-reflecting material.

Four vertical rods 113 (Figs. II, III and VI) are fastened to the corners of the base 21 to act as guides for the housing 20 when it is being removed from, or replaced on, the base 21. These rods prevent the housing from striking any of the mechanism of the scale.

If, because of error in the mechanism, a fault in the chart 92, incorrectly spaced indicia 93, or other reason, the position of the chart and the indication therefrom under a load on the scale is not correct, the indication may be permanently corrected by adjusting that one of the blocks 77 supporting the portion of the ribbon 76 which is straddled by the bifurcated end of the arm 72 at that time. Adjustment by means of turning the screw 78 deforms the ribbon 76 and, each time the arm 72 passes over the deformed part, it rocks the bell crank 70 on its axle pin 67 and through the connection between the concaveended screws 74 and the ball-ended pin 85, swings the arm 83 and the member 82 on its pivots 57 on the axles 56, and thus the chart 92 and indicator arm 86, ahead of or behind the position of the pendulum stem 54. This correctly positions the chart 92 for the load being weighed on the scale.

Each correction so made is permanent because the arm 83 swings with the pendulum stem 54 (it is connected thereto through the bell crank 70) and the arm 72 reaches the same position on the ribbon 76 each time the same load is weighed on the scale. The arm 72 is swung up or down by the ribbon 76 the same distance as it was when the correction was first made and the bell crank 70 swings the arm 83 and chart 92 behind or ahead of the pendulum stem 54 the correct amount.

The embodiment of the invention which has been disclosed may be modified to meet various requirements.

Having described the invention, I claim:

1. In a device of the class described, in combination, load counterbalancing mechanism including a pivotally mounted load responsive member, an arm pivotally mounted on said member, a transparent indicia-bearing chart adjustably mounted on said arm, means for projecting an image of said chart onto a screen, an elongated deformable member extending parallelly to the plane of movement of said load responsive member and said arm, means for deforming selected sections of said deformable member and means supported on said load responsive member operatively attached to said arm and engaging said deformable member for imparting movement to said arm relative to said load responsive member.

2. In a device of the class described, in combination, load counterbalancing mechanism including a load responsive member, an arm pivotally mounted on said member for movement relative thereto, a transparent indicia-bearing chart adjustably mounted on said arm, projection means including a screen for projecting an image of said chart to show the weights of loads on said scale, a deformable strip extending along the path of movement of said member and said arm, connecting means pivotally connected to said member and said arm and having a portion engaged with said strip and means for deforming selected portions of said strip independently of other portions of said strip.

3. In a device of the class described, in combination, a pivotally mounted load responsive member, an arm pivotally mounted on said member, the axes of oscillation of said member and said arm being parallel, a deformable strip extending along the path of movement of said member and said arm, projecting indication means, a transparent chart for cooperation with said projecting indication means mounted on said arm, means pivotally mounted in said responsive member and attached to said arm for controlling the relative positions thereof and having a portion engaged with said deformable strip, and means for adjustably deforming selected portions of said deformable strip.

4. In a weighing scale, in combination, load counterbalancing means including a load responsive member, an arm pivotally mounted on said member for relative movement therewith, indicating mechanism including a transparent arcuate chart adjustably secured to said arm and means for projecting an image of said chart, and means for controlling the relative movement of said member and said arm comprising an arcuate deformable strip mounted parallel to the path of movement of said member, a link pivoted in said member and pivotally connected to said arm and having a portion slidingly engaged with said deformable strip, and means for individually deforming selected portions of said strip for causing said link to move said arm relative to said load responsive member when selected loads are on said scale.

5. A corrective mechanism for a projecting scale comprising an arcuate strip mounted parallel to the path of movement of the load responsive member of said scale, an arm pivotally mounted on such responsive member for movement relative to such member and adjustably mounting the projection chart of said scale, means for selectively deforming portions of said strip, and a link for controlling the relative movement of said arm and such member, said link being pivotally connected to said arm and pivoted in said member and having a portion slidingly engaging said strip.

6. In a weighing scale, in combination, a pivotally mounted load responsive member, projection means including a screen, an arm pivotally mounted on said member for movement in a plane parallel to the plane of movement of said member, a transparent indicia-bearing chart adjustably mounted on said arm and movable through the projecting position of said projecting means, an arcuate deformable strip positioned along the path of movement of said member, means for deforming selected portions of said strip without deforming other portions thereof, and a crank-like link pivotally mounted on said member and operatively connected to said arm and having a portion slidingly engaging said arcuate strip for controlling the movement of said arm with respect to said member in response to rocking action caused by the passage of said slidingly engaged portion of said crank-like link over deformed portions of said strip.

7. In a weighing scale, in combination, a pivotally mounted load responsive member, an arm pivotally mounted on said member, a transparent arcuate indicia-bearing chart, adjustably mounted on said arm, a screen, means for projecting an image of said chart onto said screen, and means for correctively influencing the movement of said arm relative to said member, the last mentioned means comprising an arcuate deformable ribbon mounted parallel to the path of movement of said member, means for selectively deforming portions of said ribbon and a crank arm pivotally mounted in said member and having a short arm operatively connected to said arm and a long arm slidingly engaging said deformable ribbon and being moved over said deformable ribbon by movement of said member, the deformed portions of said ribbon swinging said crank on its axis in said member for moving said arm relative to said member.

LAWRENCE S. WILLIAMS.